US007200537B2

(12) United States Patent
Ozaki

(10) Patent No.: US 7,200,537 B2
(45) Date of Patent: Apr. 3, 2007

(54) WIRE HARNESS DESIGN SUPPORTING METHOD AND PROGRAM

(75) Inventor: Satoru Ozaki, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 749 days.

(21) Appl. No.: 10/191,688

(22) Filed: Jul. 8, 2002

(65) Prior Publication Data

US 2003/0050723 A1    Mar. 13, 2003

(30) Foreign Application Priority Data

Jul. 9, 2001    (JP)    ............................. 2001-208232

(51) Int. Cl.
*G06G 7/48*    (2006.01)

(52) U.S. Cl. ............................................. 703/7; 703/1

(58) Field of Classification Search ................ 345/419, 345/420, 629, 630, 653, 654, 625; 434/85; 700/98, 251; 703/1, 7

See application file for complete search history.

(56) References Cited

U.S. PATENT DOCUMENTS

| | | | |
|---|---|---|---|
| 4,653,159 A | | 3/1987 | Henderson et al. |
| 4,803,778 A | | 2/1989 | Cross |
| 4,939,668 A | * | 7/1990 | Brown et al. .................. 706/59 |
| 5,083,369 A | | 1/1992 | Cerda |
| 5,138,698 A | * | 8/1992 | Aldrich et al. ............... 345/427 |
| 5,280,569 A | * | 1/1994 | Tsujido ........................ 345/427 |
| 5,506,950 A | * | 4/1996 | Hughes et al. ............... 345/420 |
| 5,740,341 A | * | 4/1998 | Oota et al. .................. 345/420 |
| 6,272,387 B1 | * | 8/2001 | Yoon ............................. 700/83 |
| 6,438,435 B1 | | 8/2002 | Wada et al. |
| 6,457,165 B1 | * | 9/2002 | Ishikawa et al. ............... 716/12 |
| 6,625,299 B1 | * | 9/2003 | Meisner et al. ............. 382/103 |
| 6,867,768 B2 | * | 3/2005 | Sakakura et al. ........... 345/419 |

FOREIGN PATENT DOCUMENTS

JP    11-85811    3/1999

OTHER PUBLICATIONS

"Virtueller Strippenzieher"; DE-journal: iee, 46. edition, No. 10,2001, Hüthig GmbH & Co. KG, 69018 Heidelberg (DE); pp. 70, 72-73.

(Continued)

*Primary Examiner*—Paul Rodriguez
*Assistant Examiner*—Russ Guill
(74) *Attorney, Agent, or Firm*—Gerald E. Hespos; Anthony J. Casella

(57) ABSTRACT

To easily transform three-dimensional data of a wire harness into a two-dimensional drawing. Wire harness data of a wire harness to be routed in a desired object is inputted to a computer. The wire harness data includes coordinate information which is three-dimensionally designed in a state adapted to the object of routing. A development plane for two-dimensionally developing the wire harness data is set. The wire harness data is divided into a plurality of segments S1 to S5 at predetermined division points, and is sequentially developed to the development plane on the segment unit basis from a start point P1 of a reference trunk line 17 via a branch line 18 to a termination point, thereby two-dimensionally developing the wire harness data on the segment unit basis so that all of the segments S1 to S5 are included in the development plane.

9 Claims, 13 Drawing Sheets

OTHER PUBLICATIONS

"Embassy realisiert integrierte Prozesse in der Kabelbaum-Konstruktion"; DE-journal: CAD-CAM Report, No. 7, 2001, Dressler Verlag e.k., 69115 Heidelberg (DE); p. 12.

"Embassy(tm)—Der leistungsfähige Standard für effiziente 3D Kabelbaumkonstruktion"; product information of Linius Technologies Deutschland, 93152 Nittendorf (DE), May 2001.

* cited by examiner

S4S

WIRE HARNESS DESIGN SUPPORTING METHOD AND PROGRAM

BACKGROUND OF THE INVENTION

1. Field of the Invention

The present invention relates to a wire harness design supporting method and a technique related to the method.

2. Description of the Background Art

Generally, a wire harness installed on a vehicle is designed in such a manner that layout of main parts such as an engine, a radiator, an air conditioner and a car stereo, and various electrical components such as a control unit for controlling the main parts is designed, and after that, as shown in FIG. 21, while checking interference with the various electrical components and the vehicle body shape by using a software program called a three-dimensional design system (three-dimensional CAD) on a computer, routing of wire harnesses is designed through the various electrical components and the vehicle body so as to electrically connect predetermined electrical components. In FIG. 21, reference numeral 1 denotes a three-dimensional model indicative of the body of a vehicle, 2 denotes wire harnesses, and 3 denotes parts such as connectors electrically connected to various electrical components.

At a stage of manufacturing a wire harness, in order to suppress the number of manufacturing steps and cost, as shown in FIG. 23, a wire harness is manufactured while positioning an electric wire or electric wire bundle (hereinafter, referred to as "electric wires" or the like) 2a by jigs on a flat assembly working table 5. On the assembly working table 5, a drawing 6 for instructing manufacturing of a wire harness as shown in FIG. 22 is adhered. The drawing for instructing manufacturing of a wire harness has to be created by being two-dimensionally developed.

Conventionally, routing of the wire harness as shown in FIG. 21 is designed by using a three-dimensional CAD. After that, on the basis of the design, a drawing of a wire harness two-dimensionally developed as shown in FIG. 22 has been manually created.

According to the conventional method, as described above, the drawing 6 of the two-dimensionally developed wire harness used for the assembly working table 5 has been manually created. Reference numeral 3a in FIG. 23 denotes a connector and reference numeral 3b denotes a clamp.

At the time of actually three-dimensionally attaching a wire harness two-dimensionally developed and manufactured to a vehicle, the wire harness has to be formed in a shape that can be easily attached while reducing twist, tension and the like as much as possible. However, in reality, at the time of manually creating a drawing of wire harnesses two-dimensionally developed, the development and designing has to be made by always considering twist, bending and the like of the wire harnesses at all of branch points of the wire harness, connection points with electrical components, and the like, so that long time and enormous manpower are required.

SUMMARY OF THE INVENTION

An object of the present invention is, therefore, to provide a wire harness design supporting method capable of easily transforming three-dimensional data of a wire harness to a two-dimensional drawing, and a technique related to the method.

A wire harness design supporting method includes a wire harness data inputting step of inputting wire harness data of a wire harness to be routed in a desired object into a computer via a predetermined data inputting unit, the data including coordinate information three-dimensionally designed to a state adapted to the object of routing, a development plane setting step of setting a development plane used to two-dimensionally develop the wire harness data, and a two-dimensional transformation step of dividing the wire harness data into a plurality of segments at predetermined division points and developing the wire harness data on the segment unit basis so that all of the segments are included in the development plane.

According to a first aspect, wire harness data of a wire harness to be routed in a desired object is inputted to a computer via a predetermined data inputting unit, the data including coordinate information three-dimensionally designed to a state adapted to the object of routing (wire harness data inputting step), a development plane used to two-dimensionally develop the wire harness data is set (development plane setting step), and the wire harness data is divided into a plurality of segments at predetermined division points and is developed on the segment unit basis so that all of the segments are included in the development plane (two-dimensional transformation step). Thus, the three-dimensional data of the wire harness can be considerably easily transform into a two-dimensional drawing, and the wire harness designing period can be shortened.

Desirably, in the two-dimensional transformation step, all of segments on all of paths are sequentially developed from a desired start point of a preset reference trunk line toward a termination point into the development plane on the segment unit basis.

According to a second aspect, in the two-dimensional transformation step, all of segments on all of paths are sequentially developed from a desired start point of a preset reference trunk line toward a termination point into the development plane on the segment unit basis. Thus, two-dimensional development can be efficiently carried out without repeating trial and error.

Desirably, the development plane is preset in correspondence with an attachment region of the wire harness in the object of routing. In the development plane setting step, the computer determines the attachment region in the object of routing of each of the wire harnesses on the basis of the coordinate information of the wire harness data and determines the development plane in accordance with the attachment region.

According to a third aspect, since the development plane is preset in correspondence with an attachment region of the wire harness in the object of routing and, in the development plane setting step, the computer determines the attachment region in the object of routing of each of the wire harnesses on the basis of the coordinate information of the wire harness data and determines the development plane in accordance with the attachment region, the development plane can be considerably easily determined, and the efficiency of the process can be improved.

Desirably, the wire harness data includes information of a branch point and a parts attachment point in the wire harness and, in the two-dimensional transformation step, the division points include all of the branch points and all of the parts attachment points.

According to a fourth aspect, since the wire harness data includes information of a branch point and a parts attachment point in the wire harness and, in the two-dimensional transformation step, the division points include all of the branch points and all of the parts attachment points, the branch line and a constrain point in the object of routing of the wire harness can be easily recognized, and each segment can be divided in accordance with actual conditions of the object of routing.

Desirably, the wire harness design supporting method includes, in development of each segment in the two-dimensional transformation step, a line piece dividing step of further dividing the segment into a plurality of line pieces, performing coordinate development, and approximately simplifying the shape of the segment, and a line piece developing step of developing each of the line pieces by sequentially turning the line piece around its start point as a center so that the line piece is included in the development plane.

According to a fifth aspect, the wire harness design supporting method includes, in development of each segment in the two-dimensional transformation step, a line piece dividing step of further dividing the segment into a plurality of line pieces, performing coordinate development, and approximately simplifying the shape of the segment, and a line piece developing step of developing each of the line pieces by sequentially turning the line piece around its start point as a center so that the line piece is included in the development plane. Consequently, in a state where the information of the length of each segment is held approximately, while effectively reflecting the curved and bent state of the wire harness, two-dimensional development can be performed. Thus, two-dimensional development with little dimensional error can be realized.

Desirably, the line piece dividing step includes a line piece length setting step of setting a set value of a length of the line piece to a value which is inputted to the computer or a preset value, and a line piece defining step of, when the remainder of division of a value of a length of the segment by the set value is zero, defining the line piece by dividing the segment by the set value and, when the remainder of division of the value of the length of the segment by the set value is not zero, defining the line piece by resetting the set value by rounding up or down a value of a quotient and dividing the segment by using the newly obtained set value.

According to a sixth aspect, the line piece dividing step includes a line piece length setting step of setting a set value of a length of the line piece to a value which is inputted to the computer or a preset value, and a line piece defining step of, when the remainder of division of a value of a length of the segment by the set value is zero, defining the line piece by dividing the segment by the set value and, when the remainder of division of the value of the length of the segment by the set value is not zero, defining the line piece by resetting the set value by rounding up or down a value of a quotient and dividing the segment by using the newly obtained set value. Thus, a line piece can be easily defined, and the processing efficiency is improved.

Desirably, the two-dimensional transformation step includes a horizontal direction turning operation step of horizontally turning the each line piece, all of line pieces positioned on a termination point side of the each line piece, and segments by using a normal to the development plane as a line including the start point of the each line piece as a turn axis so that a projection line of the each line piece to the development plane coincides with a desired development line in the development plane, and a vertical direction turning operation step of turning the line piece, all of the line pieces positioned on the termination point side of the line piece, and the segments turned in the horizontal direction turning operation step around the start point of the line piece as a center to a plane perpendicular to the development plane so that the line piece coincides with the development line.

According to a seventh aspect, the two-dimensional transformation step includes a horizontal direction turning operation step of horizontally turning the each line piece, all of line pieces positioned on a termination point side of the each line piece, and segments by using a normal to the development plane as a line including the start point of the each line piece as a turn axis so that a projection line of the each line piece to the development plane coincides with a desired development line in the development plane, and a vertical direction turning operation step of turning the line piece, all of the line pieces positioned on the termination point side of the line piece, and the segments turned in the horizontal direction turning operation step around the start point of the line piece as a center to a plane perpendicular to the development plane so that the line piece coincides with the development line. Therefore, each line piece can be easily transformed into two-dimensional data by a typical processing routine, and the processing efficiency is improved.

Desirably, the direction in the development plane of the development line is determined on the segment unit basis so that the direction coincides with the direction of a projection line to the development plane of a line piece including the start point of the segment.

According to an eighth aspect, since the direction in the development plane of the development line is determined on the segment unit basis so that the direction coincides with the direction of a projection line to the development plane of a line piece including the start point of the segment, the development line in a state where the line piece can be relatively easily folded can be easily determined.

Desirably, when a line piece including the start point of the segment is perpendicular to the development plane, the direction in the development plane of the development line is determined so as to coincide with the direction of either another line piece positioned on the termination point side of the segment or a branch line connected to the termination point side of the segment.

According to a ninth aspect, when a line piece including the start point of a segment is perpendicular to the development plane, the direction in the development plane of the development line is determined so as to coincide with the direction of either another line piece positioned on the termination point side of the segment or a branch line connected to the termination point side of the segment. Thus, the development line can be determined in a rational direction in consideration of bending, twisting and the like as a whole.

Desirably, when a line piece different from the line piece including the start point of the segment is perpendicular to the development plane, the horizontal direction turning operation step is not performed but only the vertical direction turning operation step is performed on the different line piece.

According to a tenth aspect, in the case where a line piece different from the line piece including the start point of the segment is perpendicular to the development plane, even if the horizontal direction turning operation step is not performed but only the vertical direction turning operation step is performed on the different line piece, the different piece becomes not perpendicular to the development plane at the time point when the line piece on the start point side of the different piece is turned in the vertical direction. Consequently, the process can be performed without a hindrance.

Desirably, the wire harness design supporting method further includes a twist examining step of examining if a folding and a twist of each segment is irrational by determining, by comparison, whether a turn angle in the horizontal direction turning operation step and the vertical direction turning operation step exceeds a predetermined allowable reference angle or not.

According to an eleventh aspect, since the wire harness design supporting method further includes a twist examining step of examining if a folding and a twist of each segment is irrational by determining, by comparison, whether a turn angle in the horizontal direction turning operation step and the vertical direction turning operation step exceeds a predetermined allowable reference angle or not, a situation in which the product quality deteriorates can be prevented in a manufacturing design of a wire harness.

Desirably, a computer executes each of the processes by a program.

According to a twelfth aspect, by using a program for allowing a computer to execute each of the processes, the processes are automatically performed and the processing efficiency dramatically improves. Thus, an effect such that the wire harness designing period can be largely shortened is obtained.

These and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Description of Terms

Terms used in the specification will be described before describing a wire harness design supporting method according to the present invention.

"Path" in the specification denotes the shape of a path of a wire harness attached to a vehicle.

"Measurement point" denotes a point at which a wire harness is fixed or constrained by various electrical parts in a path of the wire harness and which is a point as a reference of dimension of the wire harness.

"Branch line" denotes a path from an end portion to be connected to a terminal on the other side to the first measurement point.

"Trunk line" denotes a main path excluding a branch line. The "trunk line" is further divided into a "reference trunk line" and a "branch line".

The "reference trunk line" denotes a path portion as a center of the path.

The "branch line" denotes a trunk line branched from the reference trunk line.

"Branching" denotes here that a wire harness is branched in three or more directions, and a center point of the branching is referred to as a "branch point".

In the case where a reference trunk line is bent, a point of the bending is referred to as a "reference trunk intermediate point".

"Parts" denote components (parts or elements) used for a wire harness except for an electric wire or the like. The parts include a "connector", a "protector", a "grommet", and a "clamp (clip)". The positions of the parts in designing are processed as follows.

With respect to the "connector", the position in the center of the back side of a connector is used as a design reference point.

With respect to the "protector", the position obtained by drawing a perpendicular line from a reference position of attachment to the body to the path of the wire harness is used as a design reference point.

With respect to the "grommet", the center position of a panel face of the body is used as a design reference point.

With respect to the "clamp (clip)", the position obtained by drawing a perpendicular line from a reference position of attachment to the body to the path of the wire harness is used as a design reference point.

In the specification, "armor" denotes a part (also referred to as a protection member) attached to, for example, protect or bundle electric wires or the like, and indicates the portion from an end to the other end of the armor between two neighboring measurement points on a path of a wire harness.

"Dimension" denotes a length between measurement points of the wire harness path.

"Development plane" denotes a reference plane to be two-dimensionally developed, which is a plane specified by xy coordinates. The coordinate orthogonal to the xy coordinates of the development plane is a z-axis coordinate.

"Horizontal" denotes being parallel to the development plane and "vertical" denotes being perpendicular to the development plane.

Basic Configuration

Figure 1:
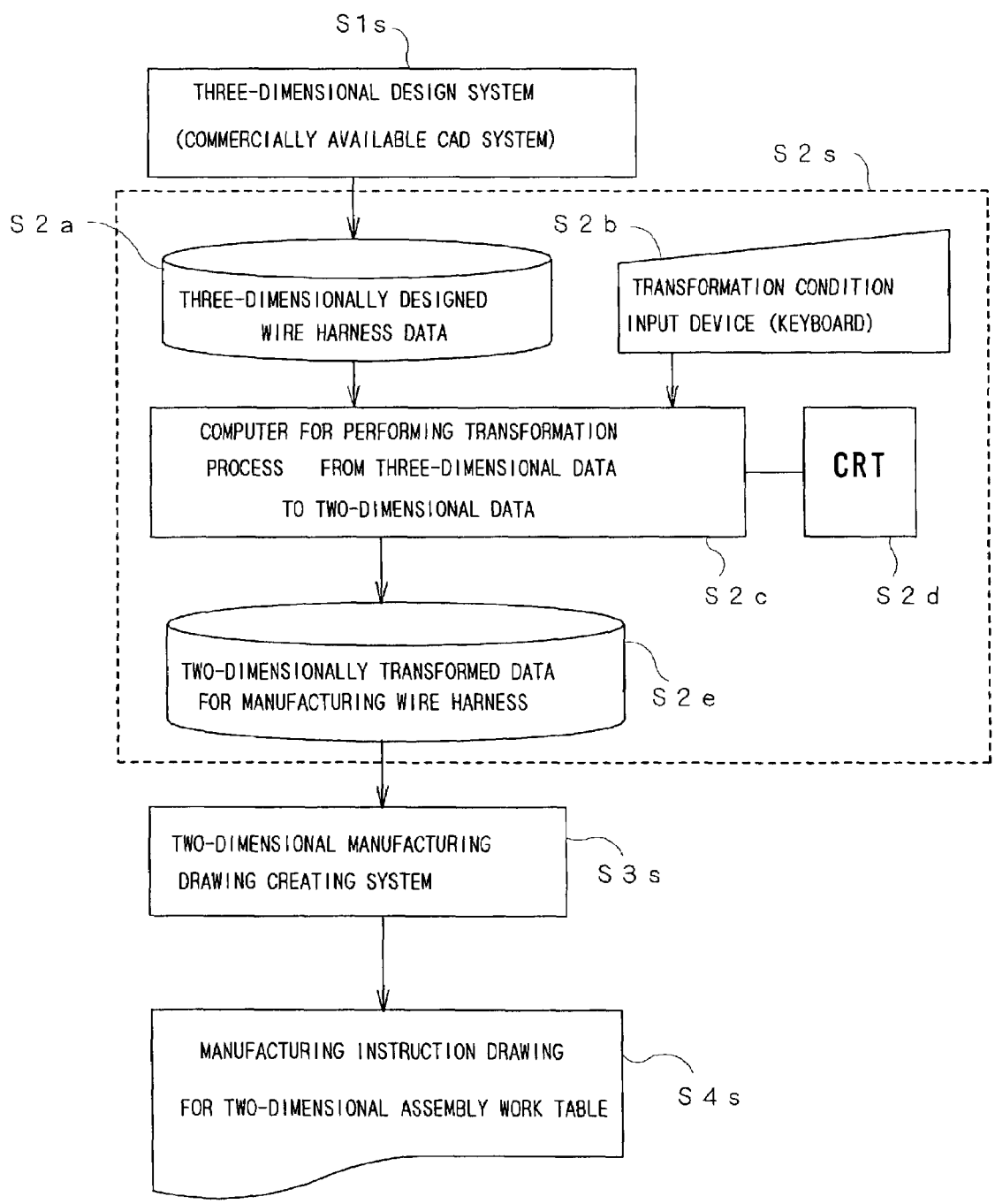
FIG. 1 is a block diagram showing a general processing system in the case of applying a wire harness design supporting method according to one embodiment of the present invention.

FIG. 1 is a block diagram showing a general processing system used in the case of applying a wire harness design supporting method according to one embodiment of the present invention.

In the processing system shown in FIG. 1, for a wire harness routed in an object such as a vehicle and various electric devices, a wire harness data S2a which is three-dimensionally designated in a state adapted to the object of routing is created by using a three-dimensional design system S1s such as a commercially available CAD system. After that, the wire harness data S2a is developed to a two-dimensional coordinate system by a wire harness design supporting system S2s. a data S2e for manufacturing a wire harness, which is developed here, is further handed over to a two-dimensional manufacturing drawing creating system S3s by which a manufacturing instruction drawing S4s for a two-dimensional assembly working table is created.

The wire harness design supporting system S2s according to the present embodiment has, as shown in FIG. 1, a transformation condition input device S2b such as a keyboard for entering information of a transformation condition of the wire harness data S2a, a computer S2c for transforming three-dimensional wire harness data to two-dimensional wire harness data on the basis of the information of the transformation condition and outputting the two-dimensional wire harness data as data S2e for manufacturing a wire harness, and a CRT (display) S2d for always displaying a process performed by the computer 2Sc and a result of the process on its screen.

As the computer S2c, a general personal computer having a CPU (central processing unit) and memory devices such as a main memory (RAM) and a hard disk drive is used. A two-dimensional development method which will be described hereinafter is realized when the CPU operates in accordance with a procedure defined by a software program prestored in the memory device on the basis of an input operation by using the transformation condition input device S2b by an operator.

The wire harness design supporting method employed in the case where a vehicle is an object of routing will be described as an example hereinafter.

Two-dimensional Development Method

1. Development Plane Setting Step

First, the wire harness data S2a three-dimensionally designed by using the three-dimensional design system S1s is inputted to the computer S2c by using a desired recording medium such as a magnetic disk, communication via a communication path such as an LAN (Local Area Network), or a predetermined input operation device such as a keyboard (the same device as the transformation condition input device S2b) (wire harness data input step). Elements (recording medium, communication path and input operation device) for inputting the wire harness data S2a are generically referred to as a data input unit.

Figure 3:
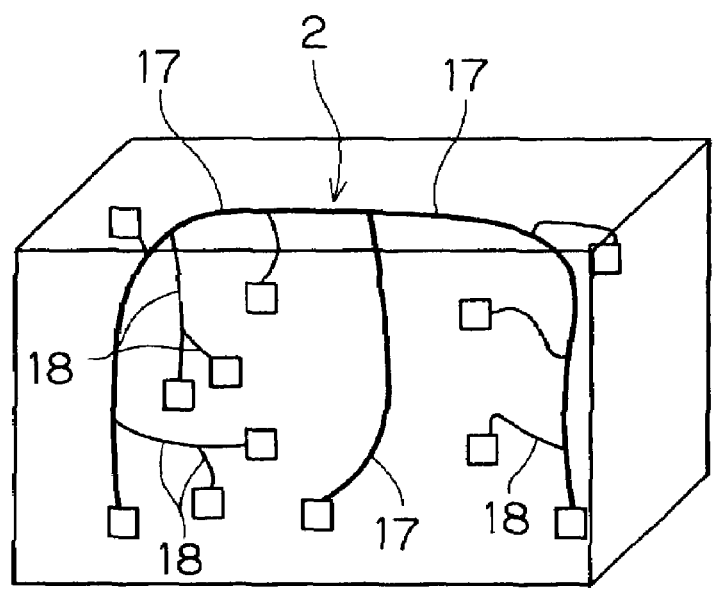
FIG. 3 is a diagram showing a wire harness.

Next, for the wire harness data S2a, a reference plane by which, as shown in FIG. 3, a routing state of the wire harness 2 can be easily recognized and two-dimensional data can be easily created is set. The reference plane is adopted as a development plane used at the time of performing two-dimensional development.

A door of a vehicle will be taken as an example. On the inside of the door, usually, the wire harnesses 2 for various electrical components such as a power window and an electronic lock are routed. In an engine room, wire harnesses are routed so as to be developed in the width direction of the body around the engine as a center. As described above, there is a part where the wire harnesses 2 are concentrated in each of the parts of the body of a vehicle, and the development directions in the parts are different from each other. It can be consequently said that it is desirable to set coordinates of routing the wire harness 2 two-dimensionally for each of the parts of the body in order to simplify processes. Therefore, the reference plane is preset as a development plane, and by using the development plane as a reference, coordinates of the wire harness 2 on a three-dimensional coordinate system are specified.

Figure 2:
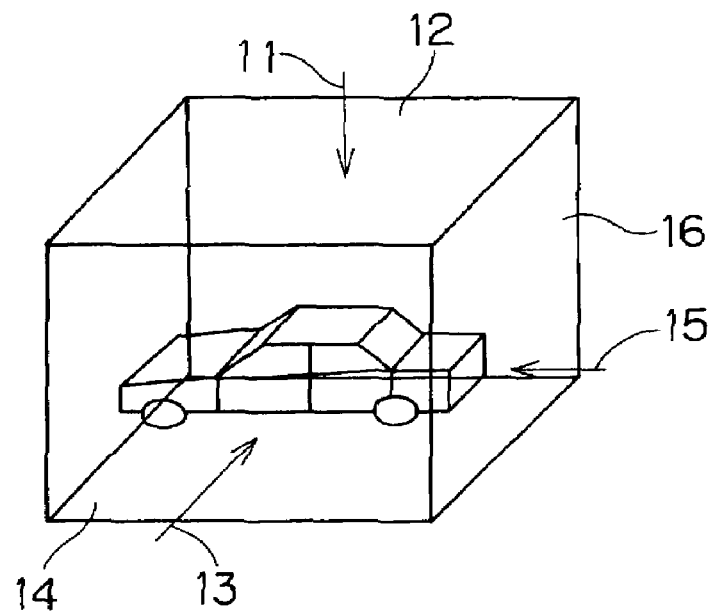
FIG. 2 is a principle diagram for describing a method of designing a developed plane.

As the development planes, planes by which the routing condition of the wire harness 2 is empirically considered to be easily grasped, such as a top face (an engine room portion and a ceiling portion) 12 seen from above 11 of the vehicle, a side face (a door portion) 14 seen from a side 13, and a rear face (a trunk portion) 16 seen from the back 15 as shown in FIG. 2 are employed. The planes 12, 14 and 16 are planes which become main planes at the time of performing two-dimensional development. As such a development plane, a preferred development plane is predetermined in correspondence with a region in which a wire harness is routed in an object of routing. It is desirable to automatically determine a region in the object of routing on the basis of information such as the kind of a harness and coordinates of the wire harness data S2a on receipt of the three-dimensional wire harness data S2a, and by the CPU, automatically determine and select a development plane associated with the region. Alternately, a development plane may be freely selected by the operator by using an operation input device such as a mouse.

2. Reference Trunk Setting Step

Generally, the wire harness 2 includes a thick portion and a thin portion. The thin portion is relatively easily bent. As for the thick portion, however, if it is bent with force, flexion or twist may occur and durability may deteriorate. Therefore, as shown in FIG. 3, it is desirable to specify the thick portion (trunk) of the wire harness 2 as a reference trunk line 17, and develop the wire harness 2 into a two dimensional representation by using the reference trunk line 17 as a reference. Considering the above, the diameters of all of passing electric wire bundles are automatically listed up on the basis of the wire harness data S2a, and the thickest electric wire bundle portion in the listed electric wire bundles is automatically used as the reference trunk line 17. In the case where the operator desires to arbitrarily designate the reference trunk line 17, while displaying a routing image of each of the development planes 12, 14 and 16 on the CRT S2d, a part in the wire harness 2 can be designated as the reference trunk line 17 by the transformation condition input device S2b such as a keyboard.

At the time the reference trunk line 17 is set, a path branched from the reference trunk line 17 is referred to as a branch line 18.

3. Two-dimensional Transformation Step

While maintaining a parts attaching direction, branching method, and dimensions, the wire harness is automatically developed to a two-dimensional representation (two-dimensional transformation) from the start point to the termination point of a work by using the reference trunk line 17 as a reference. In this case, a desired start point, for example, an end point of one side of the reference trunk line 17 is used as a start point, and the other end is used as a termination point. The process is started from the start point and two-dimensional development is sequentially performed every segment which will be described below toward the termination point and further, an end point via a branch line 18.

3-1. Segment Defining Step

Figure 4:
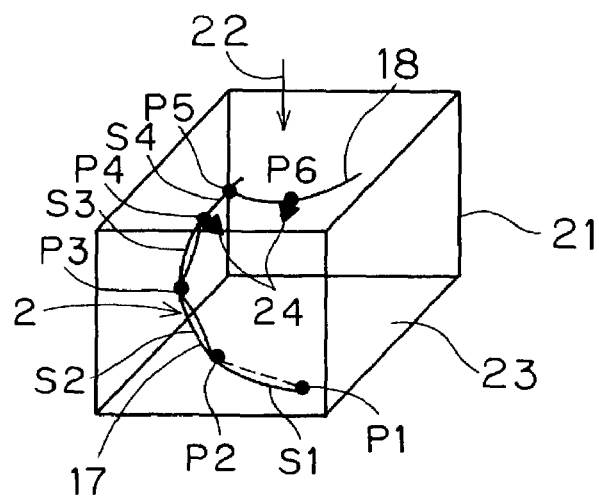
FIG. 4 is a diagram showing a wire harness developed three-dimensionally.

FIG. 4 is a diagram showing an example of the wire harness 2 designed in a three-dimensional space 21 by using the three-dimensional design system S1s. In the wire harness 2, one end point of the reference trunk line 17 is used as a base point P1. As a development plane, a plane (bottom face) 23 seen from the direction shown by the arrow 22 is employed.

Figure 5:
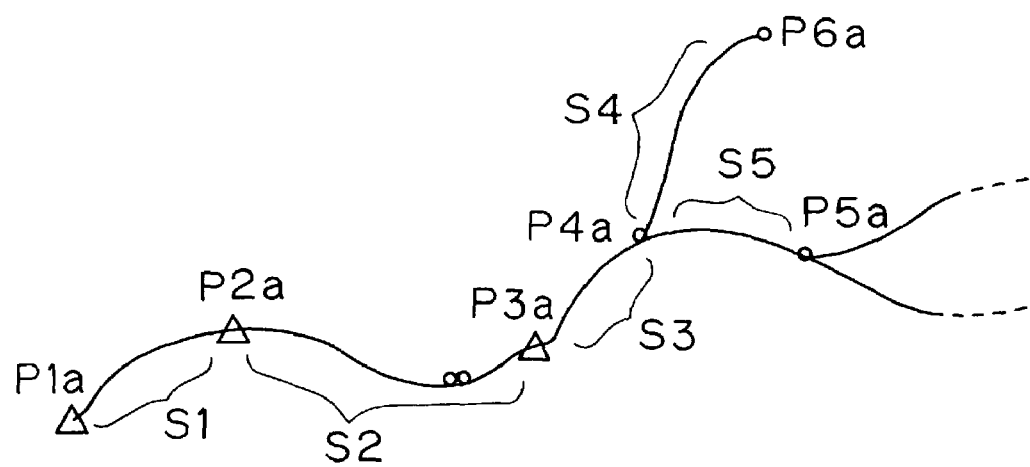
FIG. 5 is a diagram for describing segments of a wire harness.

Electric wires or the like constructing the wire harness 2 are divided into a plurality of segments S1, S2, . . . along in the length direction as shown in FIG. 5. Points P1a, and P6a in FIG. 5 are end points of electric wires or the like constructing the wire harness 2, and points P2a, P3a, . . . are division points of the segments S1, S2, . . . . It is assumed that division points of the segments S1, S2, . . . include all of measurement points P2a and P3a and all of branch points P4a and P5a.

Next, each of the segments S1, S2, . . . is divided into line pieces each having a fixed shorter length (line piece dividing step). As a concrete process, first, the operator enters a "path division arc length (=d)" of a line piece for the wire harness data S2a designed in the three-dimensional space 21 by using the three-dimensional design system S1s, by the transformation condition input device S2b such as a keyboard while visually recognizing the CRT 2Sd (line piece length setting step). It is desirable to set the length "d" of each line piece to be as short as approximately 1 cm in order to reduce an error.

Alternately, in the line piece length setting step, a value derived empirically as the "path division arc length (=d)" may be prestored in a memory device of the computer S2c and the "path division arc length (=d)" may be used as a set value of the length of a line piece.

For example, in the case where the length of any of the segments S1, S2, . . . is a multiple of the "path division arc length (=d)", all of the lengths of the line pieces are uniformly set to the value "d". Based on the following equation (1), the number "n" of line pieces in the segments S1, S2, . . . is calculated. A variable L in the equation (1) denotes the arc length of the segment, and is given as a part of the wire harness data S2a of the wire harness 2 designed in the three-dimensional space 21 by using the three-dimensional design system S1s.

$$n = L/d \quad \text{(Equation 1)}$$

Therefore, if the length L of any of the segments S1, S2, . . . is 11 cm and the path division arc length d is 1 cm, the number "n" of line pieces in the segment is 11 (=L/d=11/1). The length of each line piece in this case is 1 (=L/n=11/11) cm.

In the case where the value "L" is equal to the value "d" or less, the segment is not divided.

On the other hand, if the length "L" of any of the segments S1, S2, . . . is not divisible by the value "d", the length "L" is divided by the value "d", and an integer value obtained by rounding up the result of the division is used as the number "n" of the line pieces. When it is assumed that the length "L" of any of the segments S1, S2, . . . is 11.5 cm and the path division arc length "d" is 1 cm, the value of the quotient is 11.5 (=L/d=11.5/1). The quotient is rounded up to an integer value, the number "n" of line pieces in the segment is set as 12, and the length of each line piece is obtained as 0.9583 (=L/n=11.5/12) cm.

In such a manner, line piece division points are uniformly generated for each of the segments S1, S2, . . . to define the line piece on the basis of the "path division arc length (=d)". After that, as shown in FIG. 4, coordinates of the end point P1 of electric wires or the like constructing each wire harness 2 and division points P2, P3, . . . of the segments S1, S2, . . . are obtained and stored in a main memory. Each of the segments S1, S2, . . . is defined as, not a curved line, but approximately as a segment defined by coordinates of the end point P1 and division points P2, P3, . . . (polyline generation: line piece defining step).

In FIG. 4, reference numeral 24 denotes a clamp (clip). The arrows shown as the clamp 24 indicate the directions of attachment of the clamp 24 to the body of the vehicle. Although the clamp 24 is not an electric wire or the like, to simplify the process, each clamp 24 is also defined as one of segments. The clamps 24 will be handled in a manner similar to the segments in each of processes described later.

3-2. Two-dimensional Development Step on Each Segment

While suppressing the angle of a twist of the segments S1, S2, . . . to be within a predetermined value, a folding step is performed on each line piece by folding a line piece at each of the division points P2, P3, . . . so that all of the line pieces of the segments S1, S2, . . . lie within a development plane 23 (line piece developing step).

Figure 6:
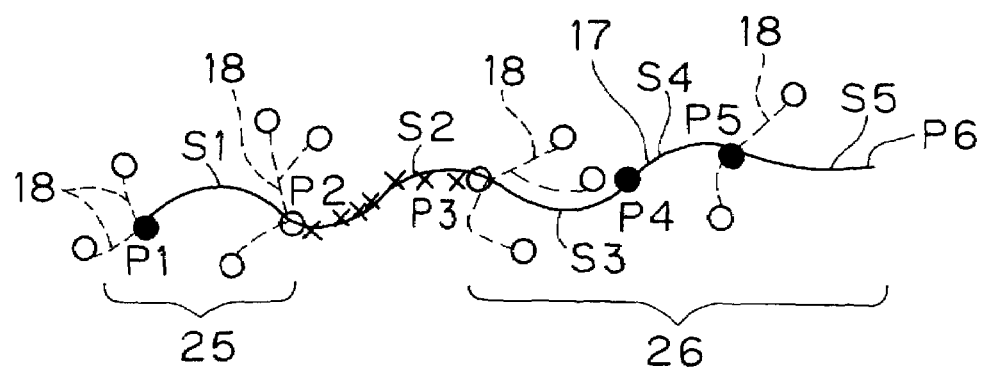
FIG. 6 is a descriptive diagram of high and low segments in a reference trunk line.

In the reference trunk line 17, as shown in FIG. 6, a portion from the start end P2 of the segment S2 as an object to the start point (such as a lead point) P1 of the reference trunk line 17 and all of branch lines connected to the portion between the points P1 and P2 (that is, all of branch lines positioned on the start point side) are relatively referred to as "high", and the segments on the high side will be referred to as "high segments" (reference numeral 25). On the other hand, a portion from the termination point P3 of the segment S2 as an object to the termination point P6 of the reference trunk line 17 and all of branch lines connected to the portion between P3 and P6 (that is, all of branch lines positioned on the termination point side) are relatively referred to as "low", and the segments on the low side will be referred to as "low segments" (reference numeral 26).

Figure 7:
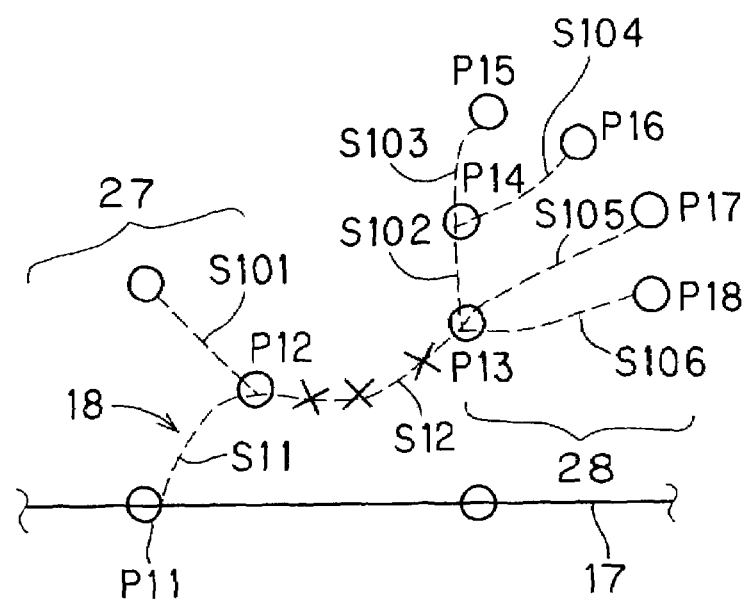
FIG. 7 is a descriptive diagram of high and low segments in a branch line.

In the branch line 18, as shown in FIG. 7, a portion from a start end P12 of a segment S12 as an object to a connection point P11 of the branch line 18 and the reference trunk line 17 and all of branch lines S101 connected to the portion from P11 to P12 are relatively referred to as "high segments 27". On the other hand, all of branch lines S102 to S106 connected between a termination P13 of the segment S12 as an object to connection points (connector attachment points) P15 to P18 with parts will be relatively referred to as "low segments 28".

3-2-1. Horizontal Direction Turning Operation Step

First, a segment to be developed is turned in the horizontal direction.

Figure 8:
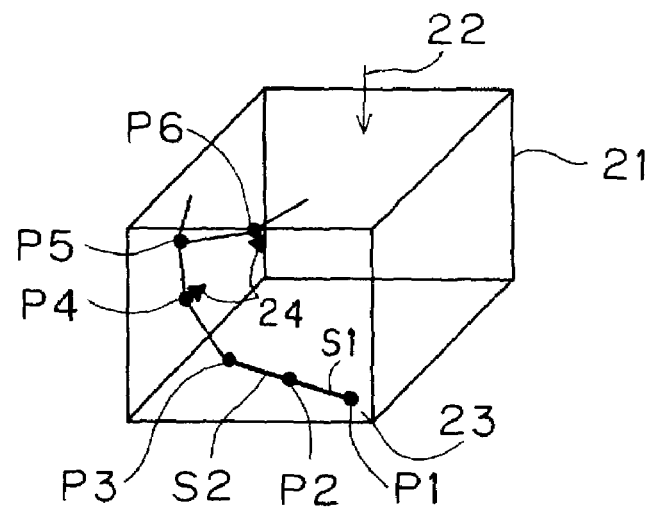
FIG. 8 is a diagram showing a state where a wire harness developed three-dimensionally is developed into a two-dimensional development plane.

As shown in FIG. 8, the first segment S1 is temporarily projected onto the development plane 23 seen from the direction shown by the arrow 22.

Figure 9:
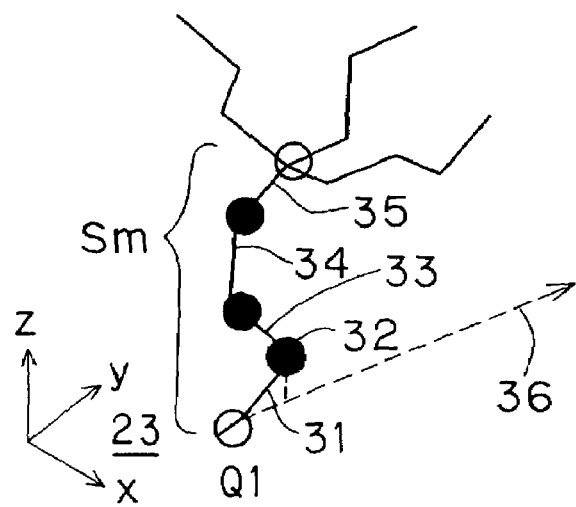
FIG. 9 is a diagram showing a state where a segment to be developed is divided into line pieces.

In this case, as shown in FIG. 9, a segment (first line piece) 31 connecting a start point Q1 (in this case, point P1) of a segment Sm (first segment S1 in this case) to be developed and a first line piece division point 32 is orthographically projected in the direction shown by the arrow 22 in FIGS. 7 and 8 to the development plane 23 about the start point Q1 of the reference trunk line 17 as a center. The direction of a line on the development plane 23 obtained by the orthographic projection is set as the direction of the development line 36.

Next, a process on a line piece (second line piece) 33 on the lower segment side of the first line piece 31 will be performed.

Figure 10:
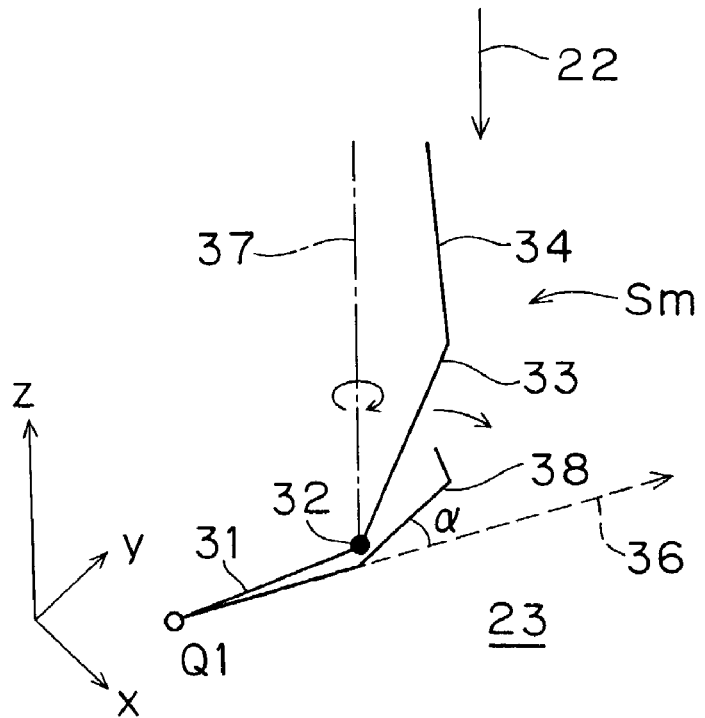
FIG. 10 is a diagram showing a turning operation in the horizontal direction.

Concretely, as shown in FIG. 10, first, the normal line to the development plane 23, passing through the start point (line piece division point) 32 of the line piece 33 is determined as a turn axis 37.

Subsequently, the angle $\alpha$ formed by a projection line 38 obtained by projecting the line piece 33 to the development plane 23 and the development line 36 is obtained.

A turn amount R$\alpha$ corresponding to the angle $\alpha$ around the turn axis 37 already determined is calculated.

The turn amount R$\alpha$ is reflected in the projection line 38, and the line piece 33 is turned in the horizontal direction (the direction of the xy plane) about the turn axis 37 so that the projection line 38 in the case of seeing the line piece 33 from the direction shown by the arrow 22 (direction of the normal to the development plane 23) coincides with the development line 36. The turn amount R$\alpha$ around the turn axis 37 is reflected also with respect to line pieces 34 and 35 on the low and high segment sides of the line piece 33 in association with the turn of the line piece 33. Coordinates obtained after the coordinate transformation are stored in the main memory of the computer S2c. Consequently, relative disposition relations between the second line piece 33 to be developed and all of the line pieces 34 and 35 and all of lower segments positioned on the low segment side of the second line piece 33 are stored in the main memory.

The above-described series of operations are similarly performed on the other line pieces 34 and 35 in the segment Sm. Consequently, all of line pieces 31, 33, 34 and 35 in the segment Sm seem to coincide with the development line 36 at the time of orthographic projection in the direction shown by the arrow 22 to the development plane 23 (direction of the normal to the development plane 23).

The turn angle $\alpha$ of each of the line pieces 31, 33, 34 and 35 is stored in the memory device in the computer S2c so as to be used in a twist examining step which will be described later.

3-2-2. Vertical Direction Turning Operation Step

Figure 11:
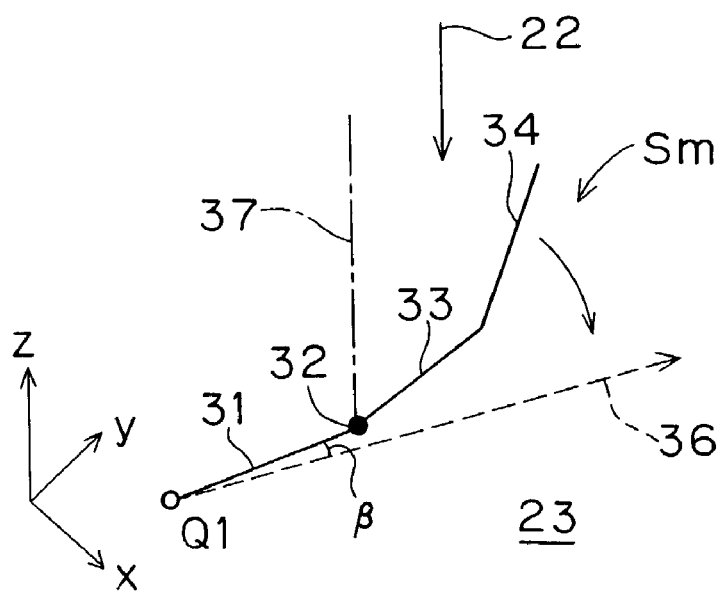
FIG. 11 is a diagram showing a turning operation in the vertical direction.

At this time point, since the original shape disposition is just turned in the horizontal direction, as shown in FIG. 11, the line pieces 31, 33, 34 and 35 of the segment Sm are in a floated state in the vertical direction from the development plane 23 in the vertical plane including the normal line to the development plane 23 and do not coincide with the development plane 23. Therefore, the line pieces 31, 33, 34 and 35 of the segment Sm in this state are turned in the vertical direction so as to be folded into the development plane 23.

Concretely, as shown in FIG. 11, an angle $\beta$ formed by the line piece 31 and the vertical plane of the development line 36 is obtained.

A turn amount R$\beta$ of only the angle $\beta$ around the start point Q1 is obtained.

The line piece 31 is turned in the vertical plane by the turn amount R$\beta$, thereby making the line piece 31 coincide with the development line 36.

The first line piece 31 therefore overlaps the development line 36 in the development plane 23. All of line pieces 33, 34 and 35 positioned on the low segment side of the first line piece 31 to be developed and all of lower segments are subjected to coordinate transformation on the assumption that the whole is turned around the point Q1 as a center in association with a turn around the start point Q1 of the first line piece 31. Coordinates obtained after the coordinate transformation are stored into the main memory of the computer S2c. By the operation, relative disposition relations between the first line piece 31 to be developed and all of the line pieces 33, 34 and 35 and all of low segments positioned on the lower segment side of the first line piece 31 are held in the main memory.

In such a manner, all of the remaining line pieces 33, 34 and 35 in the segment Sm to be developed are turned around their start points (for example, reference numeral 32) in the direction shown by the arrow 22 so as to coincide with the development line 36, and are folded to the development plane 23 side. After that, the development of the segment Sm to be developed is finished.

Figure 12:
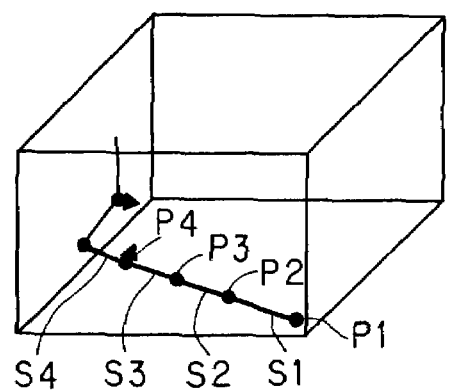
FIG. 12 is a diagram showing a state where a wire harness developed three-dimensionally is developed into a two-dimensional development plane.

By performing the horizontal and vertical directional turning operation steps, as shown in FIG. 12, the subsequent lower segments S2, S3, . . . are similarly developed into the development plane 23. In this case, by using the direction obtained by orthographically projecting the first line piece 31 in each of the segments S2, S3, . . . to the development plane 23 around the start point Q1 of each of the segments S2, S3, . . . as a center as the direction of the development line 36, line pieces are sequentially developed to the development line 36 in the development plane 23 by using each start point as a center point of turn.

The turn angle $\beta$ of each of the line pieces 31, 33, 34 and 35 is stored in the memory device in the computer S2c so as to be used in the twist examining step which will be described later.

Figure 13:
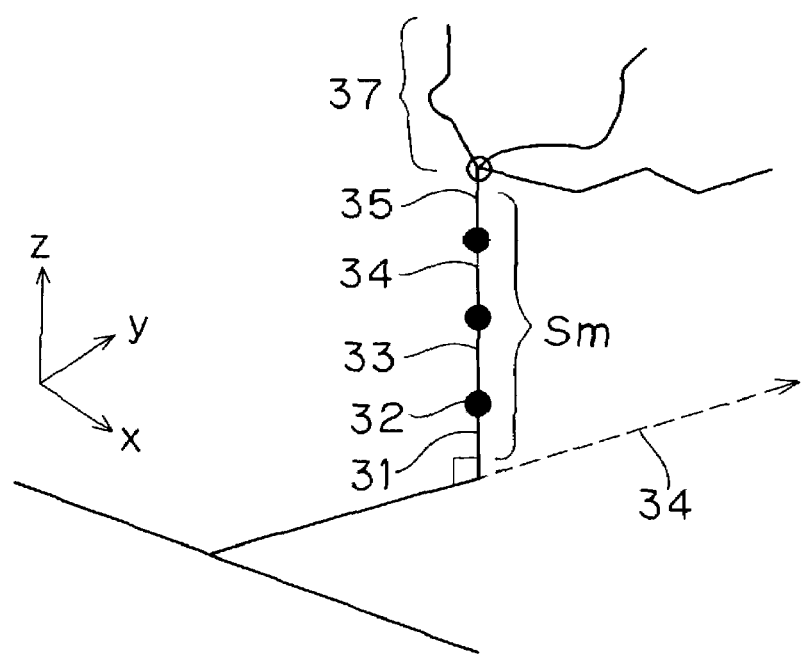
FIG. 13 is a diagram showing a state where all of line pieces of a segment in a branch line are perpendicular to a high segment.

3-2-3. Case where First Line Piece of Segment is Perpendicular to Development Plane After completion of development of a segment, when the next lower segment Sm is started to be developed, there is a case such that, as shown in FIG. 13, the first line piece 31 in the segment Sm to be developed is perpendicular to the development plane 23. In this case, the direction of orthographically projecting a line piece as the first line piece which is not perpendicular in a line sequentially connecting the start point Q1, second line piece, third line piece, . . . , and the termination point is set as the direction of the development line 36. In the case where all of the line pieces 31, 33, 34 and 35 in the segment Sm are perfectly perpendicular to the development plane 23 as a whole, the direction of the first line piece 31 of the lower segment 37 is used as the direction of the development line 36.

Whether the first line piece 31 of the segment to be developed is perpendicular to the development plane 23 or not is determined as follows. The angle formed by the development line of the segment developed last time and the first line piece 31 of the segment to be developed this time is set as $\alpha$. For example, when the following equation (2) is satisfied, the first line piece 31 is determined as perpendicular. When the equation (2) is not satisfied, it is determined that the first line piece 31 is not perpendicular. Whether the other line pieces 33, 34 and 35 are perpendicular or not is similarly determined.

$$\tan(\alpha) \geq 1/10^{-5} \quad \text{(Equation 2)}$$

3-2-4. Case where a Line Piece Lower Than the First Line Piece of a Segment is Perpendicular to the Development Plane There is a case such that, in the segment Sm to be developed, although the first line piece 31 is not perpendicular to the development plane 23, any of the line pieces 33, 34 and 35 except for the first line piece 31 is positioned in the direction of the normal (perpendicular) to the development plane 23. For example, in the examples shown in FIG. 14 (xy coordinate display) and FIG. 15 (xz coordinate display), the segment Sm to be developed is constructed by the line pieces 31, 33, 34 and 35 connecting the points Q1 to Q5. The third line piece 34 connecting the points Q3 and Q4 is disposed in the direction perpendicular to the development plane 23 as a horizontal plane. For simplicity of description, it is assumed that the first line piece 31 connecting the points Q1 and Q2 has already coincided with the development line 36.

Figure 14:
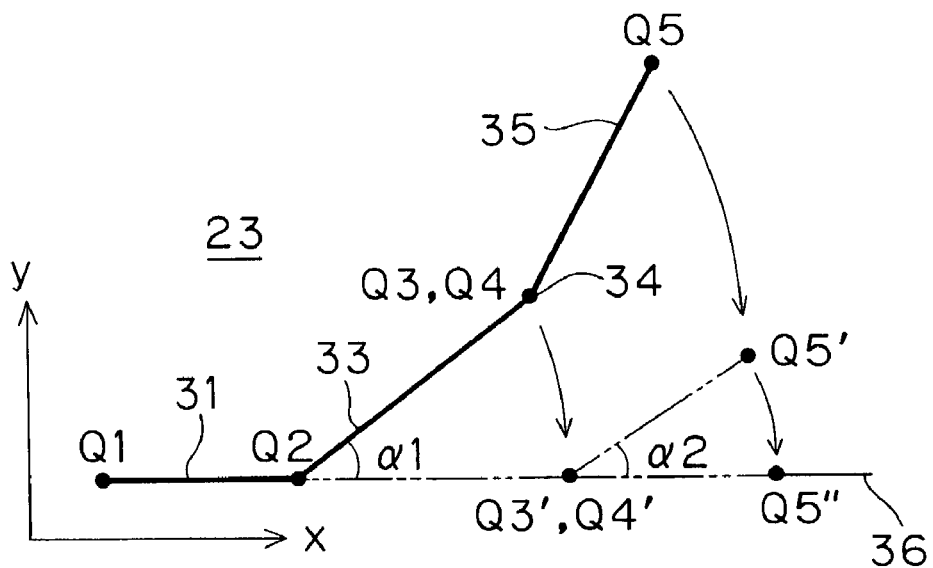
FIG. 14 is a plan view showing a state where all of line pieces except for the first line piece of a segment to be developed are perpendicular to a development plane.
Figure 15:
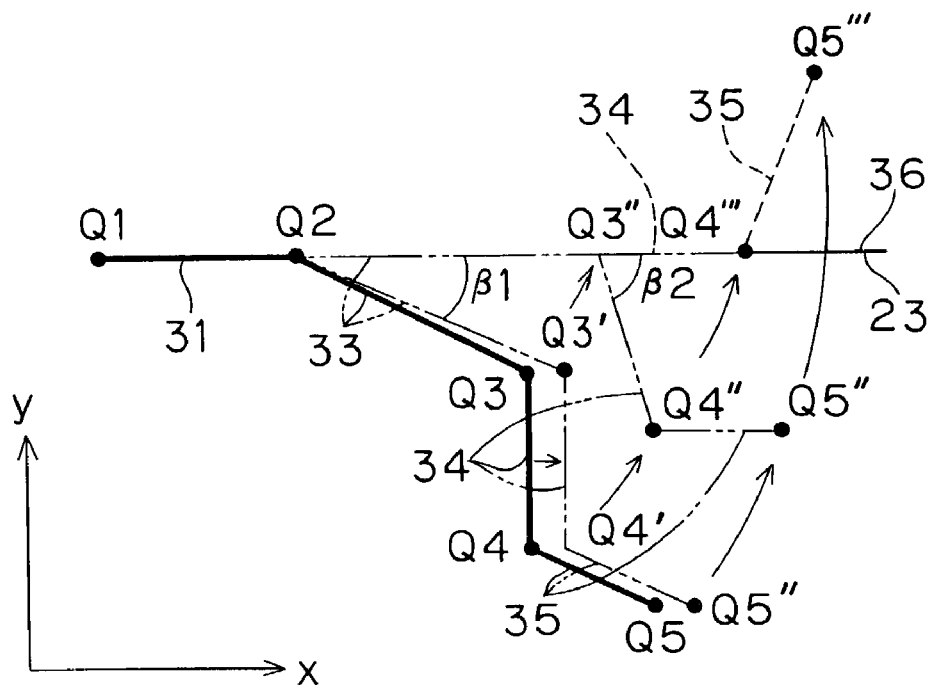
FIG. 15 is a side view showing a state where all of line pieces except for the first line piece of a segment to be developed are perpendicular to a development plane.

In this case, the angle formed by the projection line to the development plane 23 of the second line piece 33 and the development line 36 in the xy coordinate system shown in FIG. 14 is α1. Therefore, the second line piece 33 turns in the horizontal direction only by the angle α1 (turn amount Rα1) in the above-described "horizontal direction turning operation step". In association with the horizontal turn of the second line piece 33, all of the line pieces 34 and 35 on the lower side of the second line piece 33 also turn in the horizontal direction simultaneously around the point Q2 as a center only by the angle α1 (rotation amount Rα1), and the points Q3, Q4 and Q5 shift to points Q3', Q4' and Q5', respectively (FIGS. 14 and 15). At this time point, the third line piece 34 still remains in the state perpendicular (the direction of the normal) to the development plane 23.

After the step of the operation of turning the second line piece 33 in the horizontal direction, the operation moves to a process on the third line piece 34. At this time point, the third line piece 34 is positioned in a state perpendicular (in the direction of the normal) to the development plane 23 as described above. When the third line piece 34 is projected onto the development plane 23, the projection line appears as a point. Therefore, the angle formed by the projection line (point) and the development line 36 cannot be obtained. The computer S2c determining that the angle cannot be obtained does not perform the "horizontal direction turning operation step" on the third line piece 34. After that, the line piece 35 on the low side is turned in the horizontal direction only by the angle α2 shown in FIG. 14 in the usual way, thereby shifting the point Q5' to a point Q5". In such a manner, projection lines of all of the line pieces 31, 33, 34 and 35 of the segment Sm to be developed are projected to the development line 36.

The program shifts to the "vertical direction turning operation step". At this time point, the initial points Q1 to Q5 of the segment Sm to be developed are already moved to the points Q1, Q2, Q3', Q4', and Q5", respectively.

The second line piece 33 on the upstream side of the third line piece 34 in the perpendicular state is turned in the vertical plane only by the angle β1 around its start point Q2 to fold the second line piece 33 so as to overlap with the development line 36. All of the line pieces 34 and 35 on the lower side are also turned only by the angle β1 around the point Q2 as a center. The points Q3' and Q4' as points at both ends of the third line piece 34 are moved to points Q3" and Q4", respectively, and the angle formed by the third line piece 34 which had been perpendicular until then and the development line 36 becomes the angle β2 which is not the right angle. In this state, the third line piece 34 is turned in the perpendicular plane only by the angle β2 around the start point Q3" as a center in the usual way, thereby moving the points Q4" and Q5" to points Q4'" and Q5'", respectively. By the operation, the third line piece 34 initially in the perpendicular state is smoothly folded so as to coincide with the development line 36. After that, the perpendicular direction turning operation step on the fourth line piece 35 may be executed in the usual manner.

3-2-5. Case where the Start Point of a Segment is a Branch Point

Figure 16:
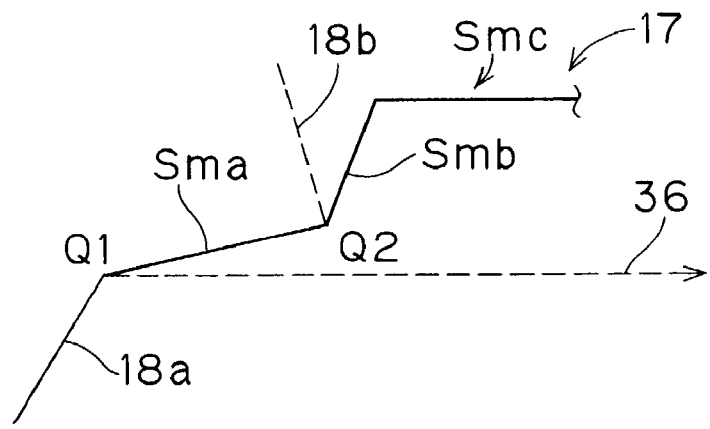
FIG. 16 is a diagram showing a folding operation to a development line.
Figure 17:
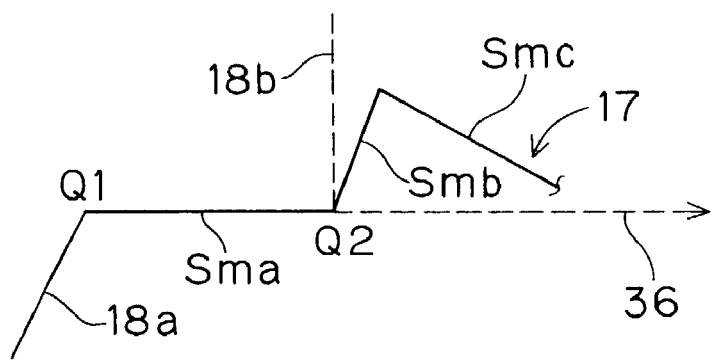
FIG. 17 is a diagram showing a folding operation to a development line.
Figure 18:
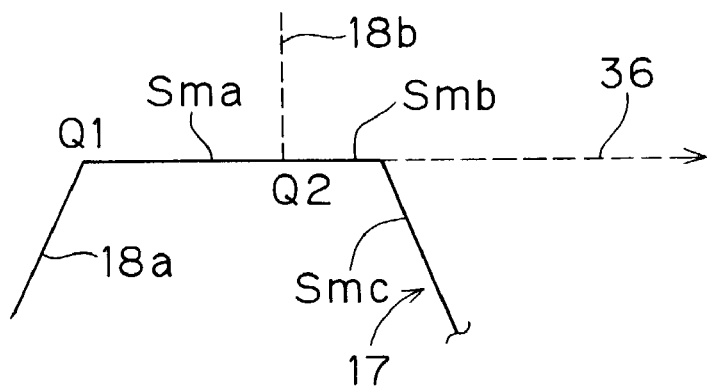
FIG. 18 is a diagram showing a folding operation to a development line.

The case where the start points Q1 and Q2 of segments Sma and Smb are branch points will now be described (FIGS. 16 to 18).

For example, when segments Sma and Smb of a reference trunk line 17 are developed to a two-dimensional plane as shown in FIG. 16, as described above, only a lower reference trunk line (for example, Smc) connected to the termination side and lower branch lines are developed in association with development of the segments Sma and Smb to be developed. However, it is assumed that branch lines 18a and 18b at the start points Q1 and Q2 of the segments Sma and Smb to be developed are not developed in association with the development of the segments Sma and Smb to be developed.

Concretely, the branch line 18a is connected to the start point Q1 of the reference trunk line Sma, and the branch line 18b is connected to the termination point Q2 of the reference trunk line Sma. In the case of developing the segment Sma by a turn so as to coincide with the development line 36 at the start point Q1 by the above method, as shown in FIG. 17, the branch line 18b connected to the terminal point Q2 of the segment Sma changes its position as the segment Sma develops. However, the branch line 18a connected to the start point Q1 of the segment Sma is maintained in the layout of FIG. 16 without being influenced by the development operation of the segment Sma. Further, also at the time of development of the following segment Smb, as shown in FIG. 18, the branch line 18b branched from the start point Q2 is maintained in the state of FIG. 17 before the development. The branch lines 18a and 18b are developed onto the development plane 23 when they become segments to be developed.

However, when the start point Q1 of the segment Sma to be developed coincides with the start point of the reference trunk line 17, it is assumed that the lower branch line 18a connected to the start point Q1 is developed in association with development of the segment Smb.

The reference trunk line 17 and branch lines 18a and 18b have been described above as an example. Similar processes are performed on other segments of branches and the like. As described above, processes similar to those on the branch line are also performed on a clamp (clip).

3-3. Data Outputting Step

Figure 19:
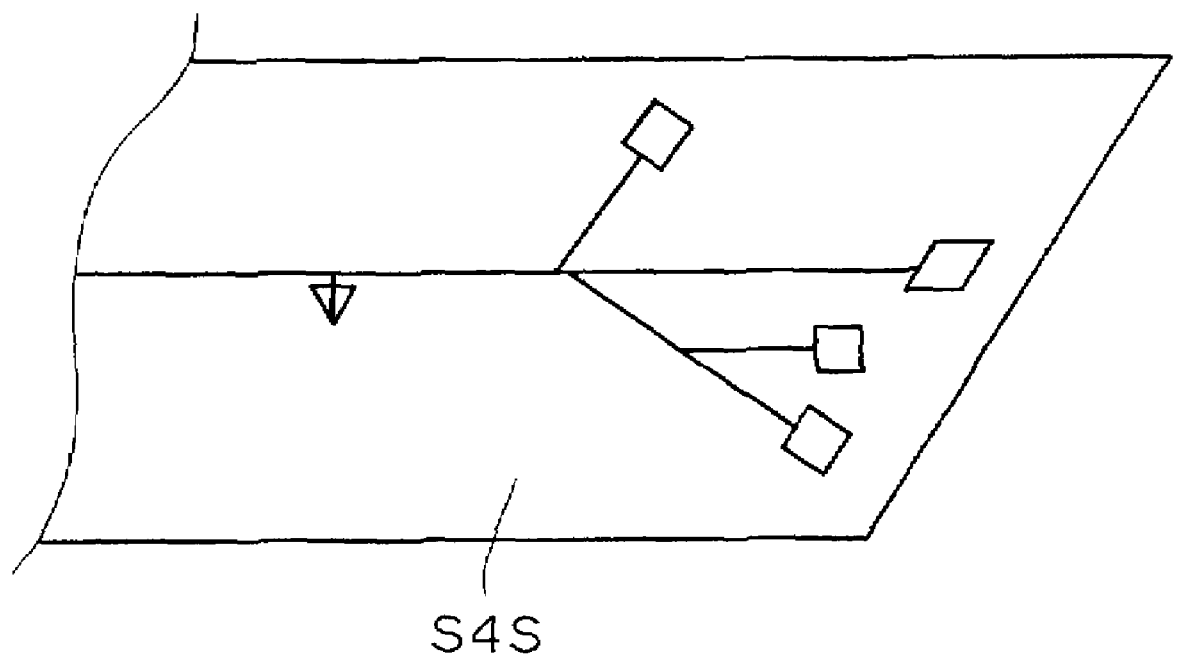
FIG. 19 is a diagram showing an instruction drawing for a two-dimensional assembly working table.
Figure 22:
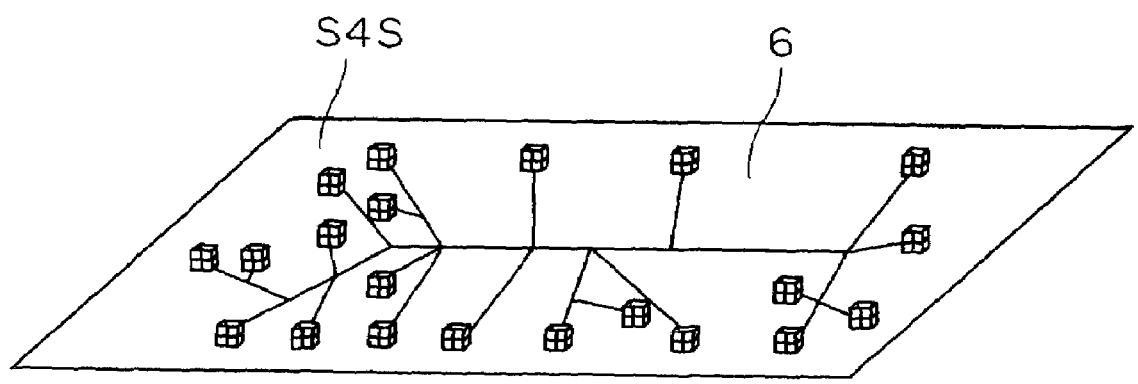
FIG. 22 is a diagram showing an instruction drawing for a two-dimensional assembly working table.
Figure 23:
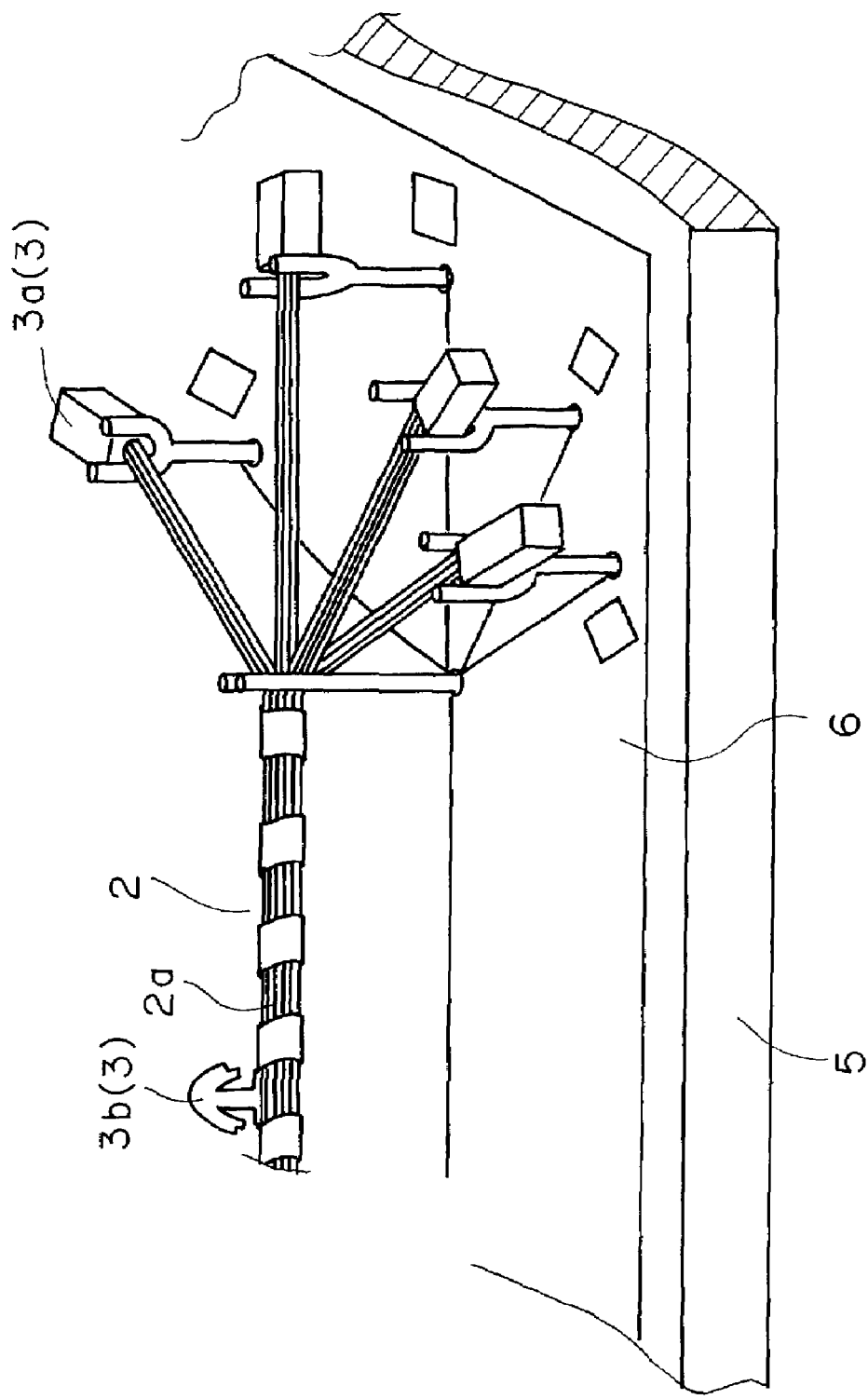
FIG. 23 is a diagram showing a state where a wire harness is assembled on an assembly working table.

The data S2e for manufacturing a wire harness, which is developed into the two-dimensional plane is further output to the two-dimensional manufacturing drawing creating system S3s and is used as tentative data for creating the manufacturing instruction drawing S4s (FIG. 19) for a two-dimensional assembly working table as shown in FIG. 22.

As described above, according to the present embodiment, the wire harness data S2a which is three-dimensionally designed by using the three-dimensional design system S1s is created. After that, while holding the information of the length of each segment and basic information such as a branching direction of a branch line, the wire harness data S2a is automatically developed two-dimensionally and a two-dimensional drawing can be easily created.

Figure 20:
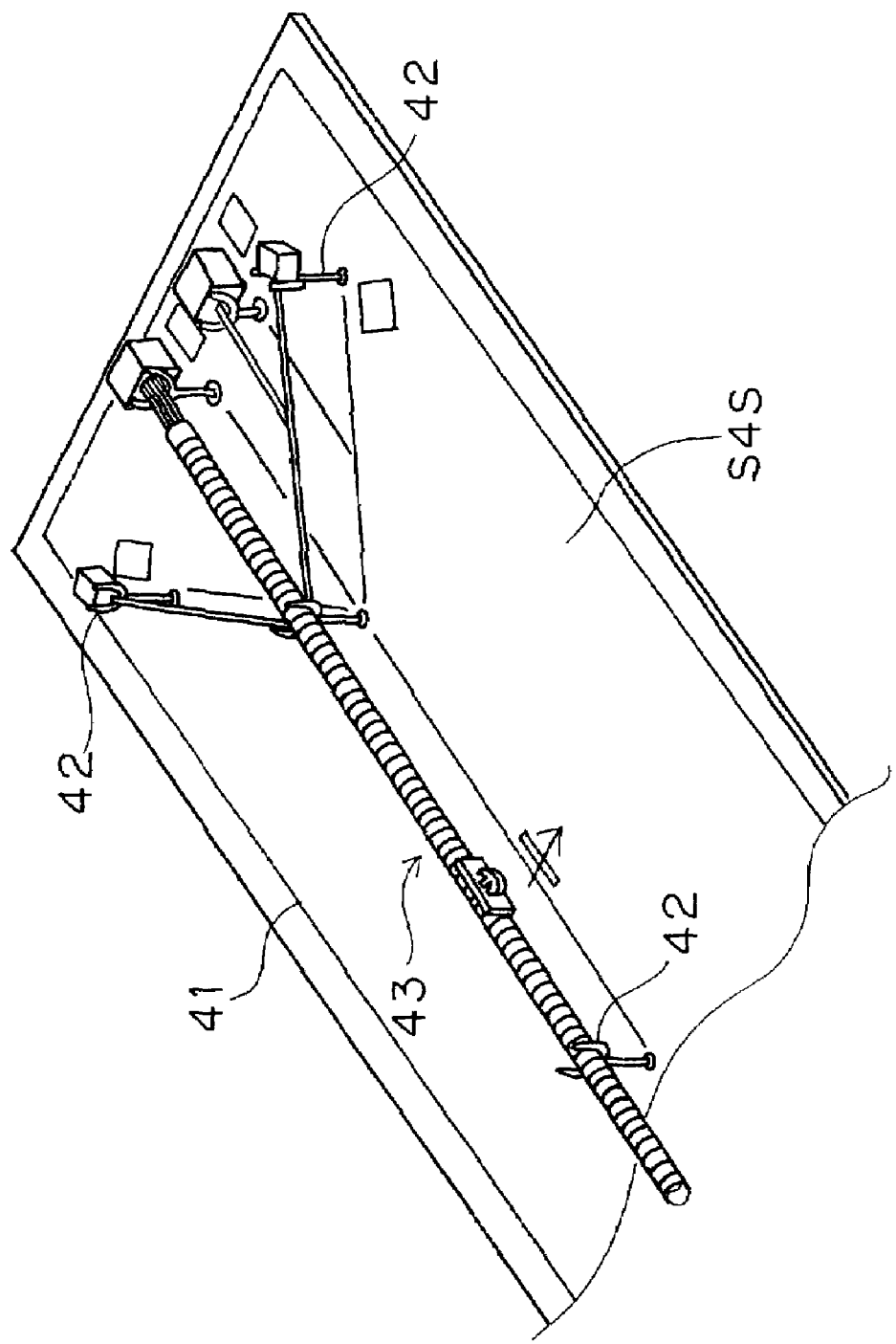
FIG. 20 is a perspective view showing a state where a wire harness is manufactured on an assembly working table.
Figure 21:
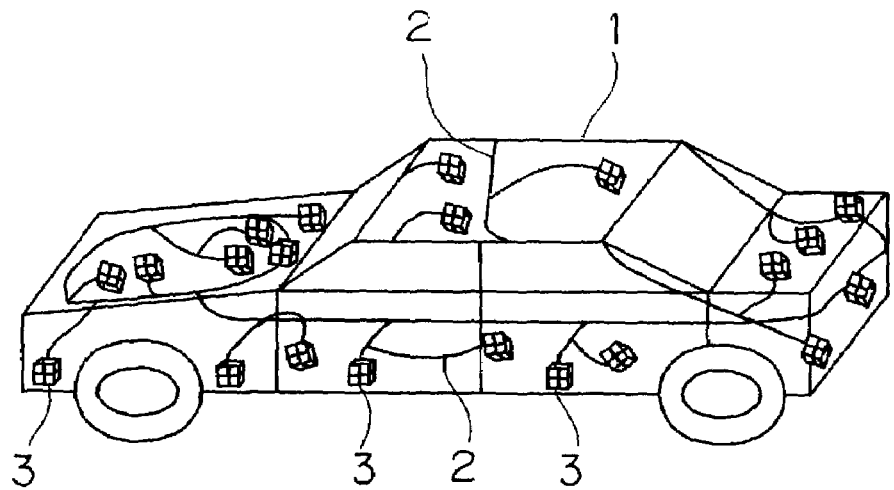
FIG. 21 is a diagram showing the shape of wire harnesses in a three-dimensional space created by a three-dimensional design system.

Therefore, in a following step, as a material drawing used to examine the diameter, bendability and the like of the basic trunk line 17, branch line 18 and so on, and further to examine various parts connected to a wire harness, in a shape similar to a basic layout in a manufacturing site for manufacturing a wire harness 43 by using jigs 42 on an actual assembly working table 41 as shown in FIG. 20, the design can be examined efficiently.

The drawing developed into the two-dimensional plane by the wire harness design supporting system of the present embodiment can be used as a tentative drawing in the case of creating the final manufacturing instruction drawing S4s (FIG. 19) for an assembly working stand for a work on the actual assembly working table 41 (see FIG. 20). Thus, considerably convenient data for manufacturing a wire harness can be therefore provided.

3-4. Twist Examining Step

Whether each of the turn angles α and β of the line pieces 31, 33, 34 and 35 obtained by the two-dimensional development steps of "horizontal direction turning operation step" and "vertical direction turning operation step" exceeds a predetermined permissible reference angle or not is examined. Specifically, since each of the turn angles α and β indicates the angle of curvature of each of the line pieces 31, 33, 34 and 35, whether irrational bending or twisting is not made in the two-dimensional development step is examined on the basis of the values of the turn angles α and β. An actual three-dimensional turn angle (γ) can be easily derived by using a trigonometric function from the turn angle α in the horizontal direction and the turn angle β in the perpendicular direction. Whether γ exceeds a predetermined allowable reference angle or not is examined.

For example, in each segment Sm, the turn angles α and β (γ) of the first line piece 31 appear as curvature at the start point Q1 in relation with a higher segment and parts such as connector connected to the start point Q1 of the first line piece 31. In the case where the segment Sm to be developed is, for example, the branch line 18 connected to the branch point Q1 of an electric line or the like, there is a case such that, due to an influence of a turn at the turn angles α and β (γ) of the first line piece 31 of the segment Sm to be developed, an electric wire (for example, the reference trunk line 17) connected to the branch point Q1 as the start point is twisted.

Further, the turn angles α and β (γ) of the line pieces 33, 34 and 35 except for the first line piece 31 of each segment Sm approximately denote angles of curvature (bending) in some midpoint of the segment Sm.

Therefore, by comparing the turn angle γ of each of the line pieces 31, 33, 34 and 35 with a predetermined allowable reference angle, whether an excessive load is applied or not can be examined with respect to bending of each segment Sm and a twist of a higher segment.

The allowable reference angle is preset according to each of electric wires constructing a wire harness. For the reference trunk line 17 having a large diameter and whose radius of curvature is difficult to be reduced, an allowable reference angle is set to a relatively small value. In contrast, for the branch line 18 having a small diameter and whose radius of curvature can be reduced, the allowable reference angle is set to a relatively large value.

In the above-described embodiment, on a segment Sm to be developed, the "horizontal direction turning operation step" is performed on all of the line pieces 31, 33, 34 and 35 constructing the segment Sm and, after that, the "vertical direction turning operation step" is performed. It is also possible to perform the "horizontal direction turning operation step" and the "vertical direction turning operation step" on each of the line pieces 31, 33, 34 and 35.

While the invention has been shown and described in detail, the foregoing description is in all aspects illustrative and not restrictive. It is therefore understood that numerous modifications and variations can be devised without departing from the scope of the invention.

What is claimed is:

1. A computer implemented wire harness design supporting method for transforming three-dimensional data of a wire harness to a two-dimensional representation of the wire harness, the method comprising:

a wire harness data inputting step of inputting wire harness data of a wire harness to be routed in a desired object into a computer via predetermined data inputting means, the data including coordinate information three-dimensionally designed to a state adapted to said object of routing;

a development plane setting step of setting a development plane used to two-dimensionally develop said wire harness data, said development plane being preset in correspondence with an attachment region of said wire harness in the object of routing, and said computer determining the attachment region in the object of routing of each said wire harness on the basis of coordinate information of said wire harness data and determining said development plane in accordance with the attachment region;

a two-dimensional transformation step of dividing said wire harness data into a plurality of segments at predetermined division points and developing said wire harness data on a segment unit basis so that all of the segments are included in said development plane, wherein all of the segments on all of paths are sequentially developed into said development plane on the segment unit basis from a desired start point of a preset reference trunk line toward a termination point of the reference trunk line, the start point defining a first end of the reference trunk line and the termination point defining a second, opposite end of the reference trunk line; and a two-dimensional representation outputting step of outputting said two-dimensional transformed data to a display or as a drawing.

2. The wire harness design supporting method according to claim 1, wherein said wire harness data includes information of at least one branch point and at least one parts attachment point in said wire harness, and in said two-dimensional transformation step, said division points include all of said branch points and all of said parts attachment points.

3. A computer implemented wire harness design supporting method for transforming three-dimensional data of a wire harness to a two-dimensional representation of the wire harness, the method comprising:

a wire harness data inputting step of inputting wire harness data of a wire harness to be routed in a desired object into a computer via predetermined data inputting means, the data including coordinate information three-dimensionally designed to a state adapted to said object of routing;

a development plane setting step of setting a development plane used to two-dimensionally develop said wire harness data;

a two-dimensional transformation step of dividing said wire harness data into a plurality of segments at predetermined division points and developing said wire harness data on a segment unit basis so that all of the segments are included in said development plane, the development of each segment in said two-dimensional transformation step further comprising a line piece dividing step of further dividing said segment into a plurality of line pieces, performing coordinate development, and simplifying the shape of the segment; wherein said line piece dividing step includes a line piece length setting step of setting a set value of a length of said line piece to a value which is inputted to said computer or a preset value and a line piece defining step of when the remainder of division of a value of a length of said segment by said set value is zero, defining said line piece by dividing said segment by the set value and, when the remainder of division of the value of the length of said segment by said set value is not zero, defining said line piece by resetting said set value by rounding up or down a value of a quotient and dividing said segment by using the newly obtained set value; and a line piece developing step of developing each of the line pieces by sequentially turning the line piece around its start point as a center so that the line piece is included in said development plane; and a two-dimensional representation outputting step of outputting said two-dimensional transformed data to a display or as a drawing.

4. The wire harness design supporting method according to claim 3, wherein said two-dimensional transformation step includes:

a horizontal direction turning operation step of horizontally turning said each line piece, all of line pieces positioned on a termination point side of the each line piece, and segments by using a normal to said development plane as a line including the start point of said each line piece as a turn axis so that a projection line of said each line piece to said development plane coincides with a desired development line in said development plane; and a vertical direction turning operation step of turning said each line piece, all of the line pieces positioned on the termination point side of the line piece, and the segments turned in said horizontal direction turning operation step around the start point of the line piece as a center to a plane perpendicular to said development plane so that said line piece coincides with said development line.

5. The wire harness design supporting method according to claim 4, wherein the direction in said development plane of said development line is determined on said segment unit basis so that the direction coincides with the direction of a projection line to said development plane of a line piece including the start point of said segment.

6. The wire harness design supporting method according to claim 5, wherein when a line piece including the start point of said segment is perpendicular to said development plane, the direction in said development plane of said development line is determined so as to coincide with the direction of either another line piece positioned on the termination point side of the segment or a branch line connected to the termination point side of the segment.

7. The wire harness design supporting method according to claim 4, wherein when a line piece different from the line piece including the start point of said segment is perpendicular to said development plane, said horizontal direction turning operation step is not performed but only said vertical direction turning operation step is performed on the different line piece.

8. The wire harness design supporting method according to claim 4, further comprising a twist examining step of examining if a folding and a twist of each segment is irrational by determining, by comparison, whether a turn angle in said horizontal direction turning operation step and said vertical direction turning operation step exceeds a predetermined allowable reference angle or not.

9. A computer-readable media on which are recorded executable instructions which when executed by a processor cause the processor to perform a wire harness design supporting method on the computer, the wire harness design supporting method comprising:

a wire harness data inputting step of inputting wire harness data of a wire harness to be routed in a desired object into a computer via predetermined data inputting means, the data including coordinate information three-dimensionally designed to a state adapted to said object of routing;

a development plane setting step of setting a development plane used to two-dimensionally develop said wire harness data, said development plane being preset in correspondence with an attachment region of said wire harness in the object of routing, and said computer determining the attachment region in the object of routing of each said wire harness on the basis of coordinate information of said wire harness data and determining said development plane in accordance with the attachment region;

a two-dimensional transformation step of dividing said wire harness data into a plurality of segments at predetermined division points and developing said wire harness data on a segment unit basis so that all of the segments are included in said development plane, wherein all of the segments on all of paths are sequentially developed into said development plane on the segment unit basis from a desired start point of a preset reference trunk line toward a termination point of the reference trunk line, the start point defining a first end of the reference trunk line and the termination point defining a second, opposite end of the reference trunk line; and a two-dimensional representation outputting step of outputting said two-dimensional transformed data to a display or as a drawing.

* * * * *